(12) United States Patent
Beaupre et al.

(10) Patent No.: US 8,356,039 B2
(45) Date of Patent: Jan. 15, 2013

(54) PROVIDING MULTIPLE MEDIA ITEMS TO A CONSUMER VIA A SIMPLIFIED CONSUMER INTERACTION

(75) Inventors: Todd Beaupre, Los Angeles, CA (US); James Decarlo, Freehold, NJ (US)

(73) Assignee: Yahoo! Inc., Sunnyvale, CA (US)

( * ) Notice: Subject to any disclaimer, the term of this patent is extended or adjusted under 35 U.S.C. 154(b) by 255 days.

(21) Appl. No.: 11/614,938

(22) Filed: Dec. 21, 2006

(65) Prior Publication Data

US 2008/0154955 A1  Jun. 26, 2008

(51) Int. Cl.
*G06F 7/00* (2006.01)
*G06F 17/30* (2006.01)

(52) U.S. Cl. ....................................... 707/754
(58) Field of Classification Search ............. 707/754, 707/999.107
See application file for complete search history.

(56) References Cited

U.S. PATENT DOCUMENTS

| | | | | |
|---|---|---|---|---|
| 5,787,413 A * | 7/1998 | Kauffman et al. | ..................... | 1/1 |
| 5,890,152 A * | 3/1999 | Rapaport et al. | ..................... | 1/1 |
| 6,041,311 A * | 3/2000 | Chislenko et al. | .......... | 705/26.7 |
| 6,049,777 A * | 4/2000 | Sheena et al. | ................ | 705/7.32 |
| 6,092,049 A * | 7/2000 | Chislenko et al. | .......... | 705/7.29 |
| 6,248,946 B1 * | 6/2001 | Dwek | ............................ | 84/609 |
| 6,389,467 B1 * | 5/2002 | Eyal | .............................. | 709/223 |
| 6,438,579 B1 * | 8/2002 | Hosken | ......................... | 709/203 |
| 6,526,411 B1 * | 2/2003 | Ward | ................................ | 1/1 |
| 6,587,127 B1 * | 7/2003 | Leeke et al. | .................. | 715/765 |
| 6,657,116 B1 * | 12/2003 | Gunnerson | ..................... | 84/615 |
| 6,684,240 B1 * | 1/2004 | Goddard | ....................... | 709/217 |
| 7,263,596 B1 * | 8/2007 | Wideman et al. | ............. | 711/209 |
| 7,680,824 B2 * | 3/2010 | Plastina et al. | ................ | 707/737 |
| 2001/0037256 A1 * | 11/2001 | Yazawa | ........................... | 705/26 |
| 2002/0010759 A1 * | 1/2002 | Hitson et al. | ................... | 709/219 |
| 2002/0019763 A1 * | 2/2002 | Linden et al. | .................. | 705/10 |
| 2002/0059094 A1 * | 5/2002 | Hosea et al. | .................... | 705/10 |
| 2003/0049014 A1 * | 3/2003 | Siddiqui | ........................ | 386/46 |
| 2003/0066090 A1 * | 4/2003 | Traw et al. | ..................... | 725/114 |
| 2003/0149612 A1 * | 8/2003 | Berghofer et al. | .............. | 705/10 |
| 2003/0233436 A1 * | 12/2003 | Slemmer et al. | ............. | 709/223 |
| 2004/0025180 A1 * | 2/2004 | Begeja et al. | ................... | 725/46 |
| 2004/0078812 A1 * | 4/2004 | Calvert | ......................... | 725/46 |
| 2004/0088328 A1 * | 5/2004 | Cook et al. | ................. | 707/104.1 |
| 2004/0128680 A1 * | 7/2004 | Karaoguz et al. | .............. | 725/25 |
| 2004/0131255 A1 * | 7/2004 | Ben-Yaacov et al. | ......... | 382/190 |
| 2004/0133914 A1 * | 7/2004 | Smith et al. | ..................... | 725/86 |
| 2004/0181817 A1 * | 9/2004 | Larner | .......................... | 725/143 |
| 2005/0015712 A1 * | 1/2005 | Plastina et al. | ............. | 715/500.1 |
| 2005/0022239 A1 * | 1/2005 | Meuleman | ....................... | 725/46 |
| 2005/0028191 A1 * | 2/2005 | Sullivan et al. | ................. | 725/28 |
| 2005/0038819 A1 * | 2/2005 | Hicken et al. | ............. | 707/104.1 |
| 2005/0055725 A1 * | 3/2005 | Stewart | ........................... | 725/92 |
| 2005/0066350 A1 * | 3/2005 | Meuleman | ....................... | 725/10 |
| 2005/0097138 A1 * | 5/2005 | Kaiser et al. | ............... | 707/104.1 |

(Continued)

*Primary Examiner* — Robert Beausoliel, Jr.
*Assistant Examiner* — Nicholas Allen
(74) *Attorney, Agent, or Firm* — James J. DeCarlo; Greenberg Traurig, LLP (57) ABSTRACT

Methods and systems of providing media to a media consumer are disclosed herein. A media rating for at least one media item can be received from a consumer and stored on a consumer profile. Using a consumer interaction, the media consumer can request to import all available media having a consumer rating higher than a predetermined threshold to an online media library of the consumer. In another embodiment, using a consumer interaction, the media consumer can request to add to an online music library all media items associated with an artist, a genre, or other media item attribute.

13 Claims, 8 Drawing Sheets

U.S. PATENT DOCUMENTS

| | | | |
|---|---|---|---|
| 2005/0283791 A1* | 12/2005 | McCarthy et al. | 725/1 |
| 2006/0026119 A1* | 2/2006 | Mirrashidi et al. | 707/1 |
| 2006/0062363 A1* | 3/2006 | Albrett | 379/101.01 |
| 2006/0156236 A1* | 7/2006 | Heller et al. | 715/716 |
| 2006/0161635 A1* | 7/2006 | Lamkin et al. | 709/217 |
| 2006/0168340 A1* | 7/2006 | Heller et al. | 709/242 |
| 2006/0195480 A1* | 8/2006 | Spiegelman et al. | 707/104.1 |
| 2006/0195789 A1* | 8/2006 | Rogers et al. | 715/727 |
| 2006/0195790 A1* | 8/2006 | Beaupre et al. | 715/727 |
| 2006/0206478 A1* | 9/2006 | Glaser et al. | 707/5 |
| 2006/0212442 A1* | 9/2006 | Conrad et al. | 707/5 |
| 2006/0242259 A1* | 10/2006 | Vallabh et al. | 709/217 |
| 2006/0242554 A1* | 10/2006 | Gerace et al. | 715/501.1 |
| 2006/0247980 A1* | 11/2006 | Mirrashidi et al. | 705/26 |
| 2006/0259355 A1* | 11/2006 | Farouki et al. | 705/14 |
| 2006/0271961 A1* | 11/2006 | Jacoby et al. | 725/46 |
| 2006/0287916 A1* | 12/2006 | Starr et al. | 705/14 |
| 2006/0288041 A1* | 12/2006 | Plastina et al. | 707/104.1 |
| 2007/0016599 A1* | 1/2007 | Plastina et al. | 707/101 |
| 2007/0055390 A1* | 3/2007 | Simon et al. | 700/19 |
| 2007/0067429 A1* | 3/2007 | Jain et al. | 709/223 |
| 2007/0077921 A1* | 4/2007 | Hayashi et al. | 455/414.1 |
| 2007/0124416 A1* | 5/2007 | Casey et al. | 709/217 |
| 2007/0143778 A1* | 6/2007 | Covell et al. | 725/19 |
| 2008/0097863 A1* | 4/2008 | Spiegelman | 705/26 |
| 2008/0154955 A1* | 6/2008 | Beaupre et al. | 707/104.1 |
| 2008/0155634 A1* | 6/2008 | Khedouri et al. | 725/118 |
| 2009/0077064 A1* | 3/2009 | Daigle | 707/5 |

* cited by examiner

PROVIDING MULTIPLE MEDIA ITEMS TO A CONSUMER VIA A SIMPLIFIED CONSUMER INTERACTION

BACKGROUND

This disclosure relates to methods and systems for simplifying the way consumers obtain multiple desired media items.

GENERAL BACKGROUND

The expansion of the Internet and the World Wide Web ("web") has given computer consumers the enhanced ability to listen to and to watch various different forms of media through their computers. This media can be in the form of audio music, music videos, television programs, sporting events or any other form of audio or video media that a consumer wishes to watch or listen to. As time evolved, consumers were able to take the music that was on at compact disc store it on their computers and listen to it locally. Recently web systems have allowed consumers to log on to a network such as the Internet and, using a media player, either listen to specific media chosen from a group of media that a particular service has to offer, or to listen to an array of media offerings such as a radio station. Different songs or other forms of media are combined to allow a consumer to listen to a group of songs in sequence, whether chosen by the consumer or by the operators of the network service. For example, such a service is Yahoo! Music. Many media players, services and other software tools enable media to be organized by a consumer on an online media library. Conventional systems require consumers to add media items to an online or local media library one by one or in groups. Therefore, adding media to an online media library can be tedious and time-consuming.

SUMMARY

In one aspect, there is a method of providing a media item to a media consumer. A media rating for at least one media item is received from the media consumer. The media rating can be indicative of the consumer's opinion of the at least one media item. The media rating can be stored on a consumer profile. A consumer interaction that represents a request to receive all available media having a consumer rating higher than a predetermined threshold can be received from the media consumer. The media rating can be retrieved from the consumer profile to determine whether the media rating of the at least one media item is higher than the predetermined threshold. The at least one media item is provided to the consumer if it is determined that the rating of the at least one media item is greater than the predetermined threshold.

In a further aspect, the media rating is received at a first Internet media service, and the at least one media item is provided at a second Internet media service. The first Internet media service can be a non on-demand media delivery service, and the second Internet media service can be an on-demand media delivery service. In another embodiment, the first Internet media service can be an Internet radio station, and the second Internet media service can be a media subscription-based media service.

In yet another aspect, the at least one media item can be provided to the consumer by adding the at least one media item to an online media library of the consumer. The at least one media item can be added to the online media library of the consumer by storing on a consumer profile a pointer to a media file corresponding to the at least one media item.

In another aspect, the consumer interaction can be received by receiving a first consumer selection that establishes the predetermined threshold, and further by receiving a second consumer selection of a user interface button in order to import the available media to an online media library of the consumer. In another embodiment, the consumer interaction can be received by receiving a single consumer selection of a user interface button that allows the user to import the available media to an online media library of the consumer.

In one aspect, there is a system of providing a media item to a media consumer comprising a ratings module, a user interface module, a search engine, and a media delivery module. The ratings module receives from the media consumer media rating for at least one media item the media rating being indicative of the consumer's opinion of the at least one media item. The ratings module can be further configured to store the media rating on a consumer profile. The user interface module receives from the media consumer a consumer interaction representing a request to retrieve all available media having a consumer rating higher than a predetermined threshold. The search engine retrieves the media rating from the consumer profile to determine whether a rating of the at least one media item is higher than a predetermined threshold. The media delivery module provides the at least one media item to the consumer if it is determined that the rating of the at least one media item is greater than the predetermined threshold.

In another aspect, there is a method of providing a media item to a media consumer. A consumer interaction that represents a request to receive all available media associated with a selected artist is received from the media consumer. The request of the media consumer can be received at a media server. At least one media item associated with the selected artist is identified. An identifier of the at least one media item is stored in a consumer profile. The at least one media item can be available to the consumer via addition to a media library associated with the consumer.

In one aspect, there is a system of providing a media item to a media consumer comprising a user interface, a search engine, and a media delivery module. The user interface module receives from a media consumer a consumer interaction that represents a request to receive all available media associated with a selected artist. The search engine searches a media database to identify at least one media item associated with the selected artist. The media delivery module can provide the at least one media item to the consumer via addition to a media library associated with the consumer.

In one aspect, there is a method of populating a media library of a media consumer. An indication is received from the media consumer of a desire to import into a media library at least one media item that has been rated by the media consumer in connection with a non-on-demand internet radio service of a service provider. The at least one media item rated by the media consumer in connection with the internet radio service is located. The located at least one media item is imported into a media library of the media consumer such that the consumer may access the media item at a time and in a manner of the media consumer's choosing.

DRAWINGS

The features and objects of alternate embodiments of the present disclosure will become more apparent with reference to the following description taken in conjunction with the accompanying drawings of various examples wherein like reference numerals denote like elements and in which.

DETAILED DESCRIPTION

Various methods and systems for media delivery are disclosed herein. A service provider can host one or more Internet media services. Media consumers can access the media services provided by the service provider in order to access music, images, videos, etc. Media services can include a non-on-demand streaming radio station that provides streaming of media to a consumer computing device. The media streamed to the consumer can be selected based on consumer's ratings or expressions of preferences. Furthermore, media consumers can be provided with access to a personalized online media library that may or may not be duplicated locally. The online media library can be accessed by the consumer at any time, and permit the user to select any media item in the library on demand. The online media library can be stored as a set of references or pointers in the user profile. The set of references or pointers can essentially be bookmarks to media items that the user likes and that has added to his library. Alternatively, the online media library can include actual media content data and not just pointers to the media files. Therefore, as media is delivered to a consumer, either a digital file of the media content, or an address, pointer or reference to the location of such digital file of the media item can be provided to the consumer.

As disclosed herein, media consumers can add or import media to the online library, or any other form of media subscription service. The media consumer can rate media items based on media characteristics (e.g., artists, genres, albums, songs). The media consumer can then add all of the media rated at a predetermined level using a single interaction, such as a user interface button click. In addition, the media consumer, without having to provide a rating to a set of media items, can select to add a set of media items to the online media library of the user. To do this, the media consumer can be provided with a single-interaction user interface mechanism such as a button. The consumer can select the user interface mechanism in relation to an artist, gender, album, etc. For example, the media consumer can select to add to the consumer's library all available media items associated with a selected artist.

Figure 1:
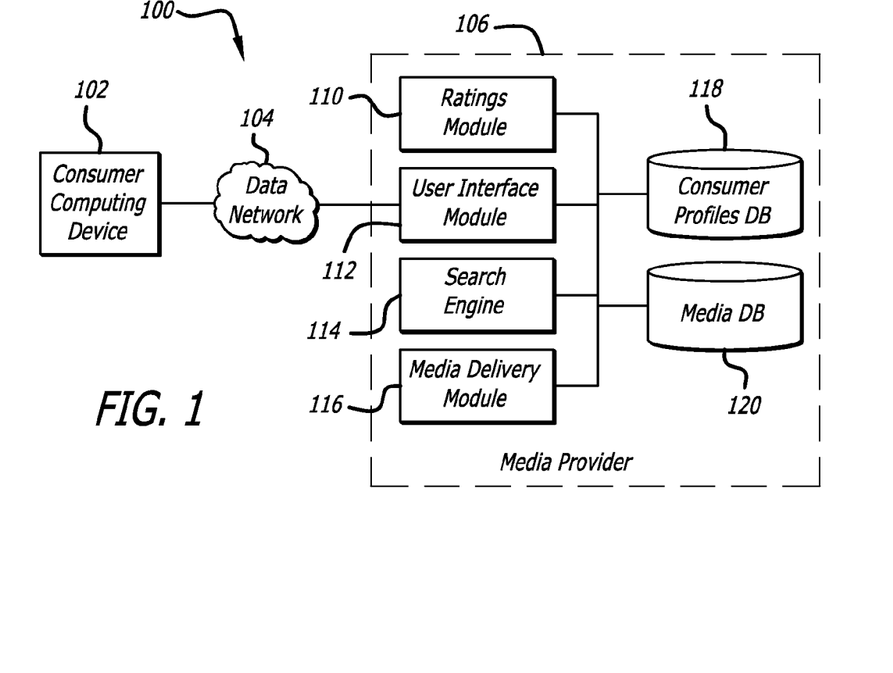
FIG. 1 depicts a component diagram of a system for providing media to a consumer according to one embodiment.

FIG. 1 depicts a component diagram of a system for providing media to a consumer according to one embodiment. Media can be provided to a consumer by a media provider 106. In one embodiment, the media provider 106 can host one or more Internet services of media delivery over a data network 104. As such, the media provider 106 can be a business entity that owns and operates a computer infrastructure connected to the data network 104 in order to provide and distribute media content to one or more media consumers. In one example, the data network 104 can be the Internet. In another example, the data network 104 can be an intranet. In yet another example, the data network 104 can be a WAN or a LAN network.

In one embodiment, the media consumer can utilize a consumer computing device 102 to establish communication via the data network 104 with one or more computing modules and/or services that are part of the computer infrastructure managed by the media provider 106. In one embodiment, the consumer computing device 102 includes a processor that permits loading and executing of computer programs to render media files. By way of non-limiting example, the consumer computing device 102 can be a personal computer, a cellular telephone, a personal data system, a personal or portable media player or any other computing device capable of receiving, interpreting and rendering media files. In addition, the consumer computing device 102 can be configured with a memory module that stores one or more software components such as messaging programs, a digital rights management component, media files, plug-in applications, media data bases, etc.

In one embodiment, a ratings module 110 can be included as part of the computer infrastructure operated by the media provider 106. The ratings module 110 can be configured to interact with the user interface module 112 in order to receive consumer commands and messages indicative of consumer ratings of media. In one example, the consumer can provide ratings of one or more artists. In another example, the consumer can provide ratings of one or more songs. In yet another example, the consumer can provide ratings of one or more videos. In yet another example, the consumer can provide ratings of one or more genres.

In one embodiment, the consumer can submit ratings of one or more media items through a website hosted by the media provider 106. The consumer can access such website through a web browser installed at the consumer computing device 102. As such, the media ratings received from the consumer can be indicative of the consumer's opinion or preferences of one or more media items. Furthermore, the ratings module 110 can be configured to store the consumer's media ratings as part of a consumer profile. The consumer profile can be stored at a consumer profiles database 118. In another embodiment, the consumer profile can simply be a collection of cookies or other implanted data at the consumer computing device 102 that can be retrieved by a media provider 106 in order to determine consumer preferences and media ratings of the consumer.

Furthermore, the ratings module 110 can be a module that is associated with one of the services provided by the media provider 106. The consumer's ratings processed by the ratings module 110 can be later used by additional or separate services of the media provider 106 or third-party providers. As such, in one example, the ratings module 110 can be the ratings module of an Internet radio web cast station. In another embodiment, the ratings module 110 can be the ratings module of a subscription-based media delivery service.

In another embodiment, the computer infrastructure of the media provider 106 can also include a user interface module 112. The user interface module 112 can be configured with a web server computer program that can render web pages communicated to the consumer's computing device through the data network 104. The consumer computing device can then render such web pages using a web browser installed at the consumer computing device 102. Therefore, in one embodiment, the user interface module 112 can be a collection of software modules that include computer coding in HTML, XML or any other markup language that can be rendered at a web browser. In another example, the user interface module 112 can be a collection of software modules or processes that transmit and receive data from a computer application running at the consumer computing device 102. The user interface module 112 can be configured to receive instructions from a consumer at the consumer computing device 102 so as to permit the consumer to manage the consumer's ratings, preferences, profile, etc. For example, a consumer can create a consumer profile associated with an account at the user interface module 112 and manage songs, videos and multimedia preferences. In addition, the consumer can also manage media that the consumer has expressed to be interested in, as well as media that has been tagged, rated or subscribed to.

The user interface module 112 cooperates with one or more modules with the media provider 106 in order to receive consumer requests, responses and interaction, as well as submit over the data network 104 messages to the consumer computing device 102. For example, the user interface module 112, as previously mentioned, can be configured to communicate with the ratings module 110 in order to receive, store and retrieve the preferences and ratings for media. In another example, the user interface module 112 can communicate with a search engine 114, in order to receive search queries for media, as well as search results to the media consumer. In addition, the user interface module 112 can further communicate with a media delivery module 116 in order to permit delivering media to the consumer through a data network 104. Further, the user interface module 112 can communicate with the media delivery module 116 to deliver media to a consumer profile at the consumer profile's database 118.

In a further embodiment, the user interface module 112 can be configured to receive from the media consumer a single consumer interaction representing a request to retrieve all available media having a consumer rating higher than a predetermined threshold. Therefore, the media consumer can submit a single interaction, such as clicking on a hyperlink or a button to submit a command to the user interface module 112. The command can comprise a request to receive all media that has been rated with a particular score by the consumer. Therefore, the user interface module 112 can interact with the search engine 114 in order to search for appropriate media in the media database 120 that would meet the predetermined threshold based on the user's rating of the search media.

In another embodiment, the user interface module 112 can be configured to receive from the media consumer a single consumer interaction representing a request to receive all available media associated with a selected artist, genre, etc. Thus, for example, if a consumer determines that she likes a particular artist, the system, in response to the consumer interaction indicating a desire to receive all media associated with that artist, would make all media items associated with the selected artist part of that consumer's media library. The system can also be configured to then automatically continue to add any new media from that artist to the consumer's media library as it continues to become available after the interaction, thus relieving the consumer from the need to track new media from the artist and add it herself in the future. As previously mentioned, the single interaction can be selecting a button on a website or a hyperlink on a website provided by the media provider 106. The user interface module 112 can operate with the search engine 114 in order to search for media at the media database 120 for media corresponding to the selected artist. Furthermore, the user interface module 112 can be configured to receive a single consumer interaction to identify media associated of another characteristic, such as media in a genre, etc.

In another embodiment, a search engine 114 can be included as part of the computer infrastructure of the media provider 160. The search engine 114 can be configured to retrieve media ratings from the consumer profile located at the consumer profile database 118 or at any other previously indicated location. Thus, the search engine 114 can identify whether a rating of a particular media item is higher than a predetermined threshold. In one embodiment, the predetermined threshold can be established by the media consumer. In another embodiment, the predetermined threshold can be established by the media provider 160. Thus, for example, if a consumer has been listening to one or more non-on-demand streaming radio stations of a service provider, the consumer may have invested significant time in rating music or other media to customize the consumer's radio listening experience. Should that same service, or a related service, provider offer an on-demand media subscription service or purchase system as well, the consumer will need to select items she desires to be included in her on demand media library. Using the functionality described herein, a consumer could simply instruct the system to import into her music library any media item that was rated over a certain threshold in the radio station service. Thus, with a single consumer interaction, the consumer is spared the need to manually populate her music library with desired media.

In a further embodiment, an additional consumer interaction can be received from the media consumer that indicates the rating level of media items to be added to the media library. This permits the consumer to import media that the consumer has rated higher than a consumer pre-selected level or threshold.

In further embodiments, alternate fee structures, or the ability to offer bulk rates, or to calculate a price for approval before the consumer finalizes the transfer (to allow the consumer to increase or decrease the number of items moved into her library), can be included as part of the transfer process.

The threshold and the scale can be arbitrarily implemented or consumer selected. In one example, the predetermined threshold can be a consumer rating of three out of five points. In another example, the predetermined threshold can be a consumer rating of eight out of ten points. In another embodiment, the search engine 114 can be configured to search in a media database 120 media associated with a selected artist in order to identify at least one media item associated with the selected artist.

In one embodiment, the media provider 106 can include one or more data repositories that store consumer profiles as well as media. For example, the media provider 106 can include a consumer profiles database 118 and a media database 120. The consumer profiles database 118 can include consumer profiles that store demographic information of each consumer such as name, address, gender, age, etc., as well as consumer preferences and media ratings. Any other data that can be used to personalize consumer experience can also be stored at the consumer profile and accessed by any module of the media provider 106 in order to customize and personalize media operations as related to the consumer. Furthermore, the media database 120 can be accessed by one or more modules in order to search, store, retrieve, one or more media items stored in the media database 120.

A media delivery module 116 can be included as part of the computer infrastructure of the media provider 106. The media delivery module 116 can be configured to provide a media item to the consumer that has been determined to have a rating greater than a predetermined threshold. As previously mentioned, such media item can be searched and identified by the search engine 114. In one embodiment, the media delivery module 116 can simply add to the consumer profile a media identifier corresponding to the media item being added. In another embodiment, the media delivery module 116 can add a reference or pointer to the media item that resides at the media database 120. The pointer can be added to the consumer profile stored at the profiles database 118. In another embodiment, the media delivery module 116 can be configured to provide one or more identifiers of media items corresponding to all media items in an artist's catalog. In another embodiment, the media delivery module 116 can be configured to add pointers or identifiers corresponding to one or more media items associated with a specific media genre. As such, in general, the media delivery module 116 can be configured with logic to deliver one or more media items to the media consumer. The one or more media items are delivered to the consumer by either providing a digital copy of the media item to the consumer or providing a reference or pointer to access such media item, and updating the consumer's media library accordingly.

In a further embodiment, the media delivery module 116 can be part of a second Internet service, while the ratings module 110 can be part of a first Internet service. As such, ratings provided by a consumer at the first Internet service (e.g., webcast station), can be utilized to deliver media at the second Internet service.

While various databases have described herein, one skilled in the art will recognize that each of the aforementioned databases can be combined into one or more data repositories, and be located either locally or remotely. In addition, each of the aforementioned databases can be any type of data repository configured to store data and can be implemented using any methods of storage now known or to become known. Likewise, while various modules have described herein, one skilled in the art will recognize that each of the aforementioned modules can be combined into one or more modules, and be located either locally or remotely. Each of these modules can exist as a component of a computer program or process, or be standalone computer programs or processes recorded in a data repository.

Figure 2:
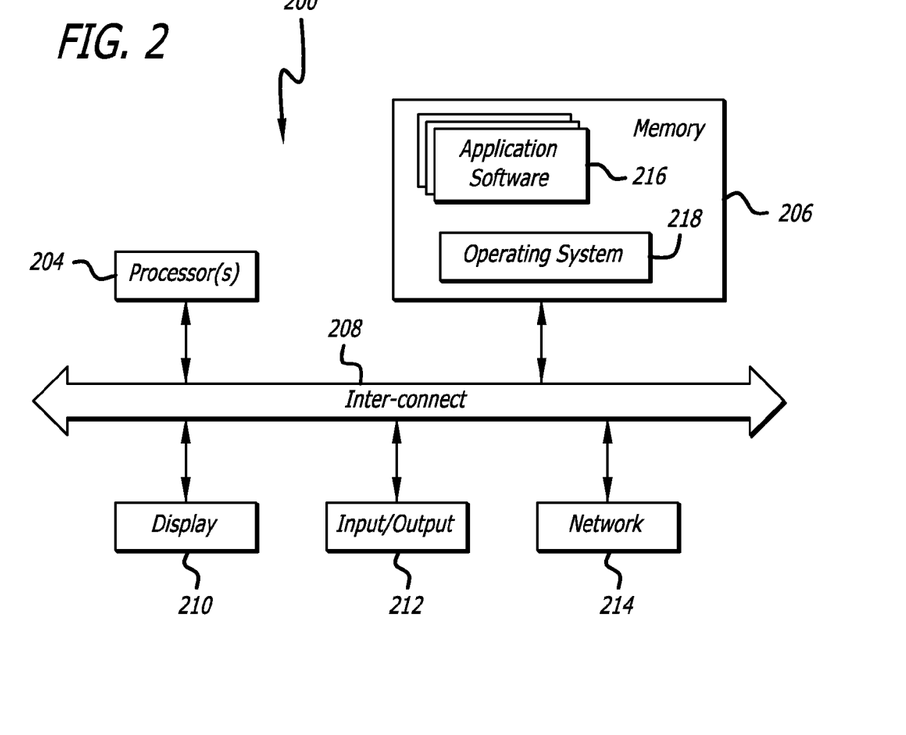
FIG. 2 depicts a component diagram of a computing device according to one embodiment.

FIG. 2 depicts a component diagram of a computing device according to one embodiment. The computing device 200 can be utilized to implement one or more computing devices, computer processes, or software modules described herein. In one example, the computing device 200 can be utilized to process calculations, execute instructions, receive and transmit digital signals, as required by the consumer computing device 102. The computing device 200 can be utilized to process calculations, execute instructions, receive and transmit digital signals and/or data as required by the ratings module 110, user interface module 112, search engine 114, and media delivery module 116.

The computing device 200 can be any general or special purpose computer now known or to become known capable of performing the steps and/or performing the functions described herein, either in software, hardware, firmware, or a combination thereof.

The computing device 200 includes an inter-connect 208 (e.g., bus and system core logic), which interconnects a microprocessor(s) 204 and memory 206. The inter-connect 208 interconnects the microprocessor(s) 204 and the memory 206 together. Furthermore, the interconnect 208 interconnects the microprocessor 204 and the memory 206 to peripheral devices such input ports 212 and output ports 210. Input ports 212 and output ports 210 can communicate with I/O devices such as mice, keyboards, modems, network interfaces, printers, scanners, video cameras and other devices. In addition, the output port 210 can further communicate with the display 104.

Furthermore, the interconnect 208 may include one or more buses connected to one another through various bridges, controllers and/or adapters. In one embodiment, input ports 212 and output ports 210 can include a USB (Universal Serial Bus) adapter for controlling USB peripherals, and/or an IEEE-1394 bus adapter for controlling IEEE-1394 peripherals. The inter-connect 208 can also include a network connection 214.

The memory 206 may include ROM (Read Only Memory), and volatile RAM (Random Access Memory) and non-volatile memory, such as hard drive, flash memory, etc. Volatile RAM is typically implemented as dynamic RAM (DRAM), which requires power continually in order to refresh or maintain the data in the memory. Non-volatile memory is typically a magnetic hard drive, flash memory, a magnetic optical drive, or an optical drive (e.g., a DVD RAM), or other type of memory system which maintains data even after power is removed from the system. The non-volatile memory may also be a random access memory.

The memory 206 can be a local device coupled directly to the rest of the components in the data processing system. A non-volatile memory that is remote from the system, such as a network storage device coupled to the data processing system through a network interface such as a modem or Ethernet interface, can also be used. The instructions to control the arrangement of a file structure may be stored in memory 206 or obtained through input ports 212 and output ports 210.

In general, routines executed to implement one or more embodiments may be implemented as part of an operating system 218 or a specific application, component, program, object, module or sequence of instructions referred to as application software 216. The application software 216 typically can comprises one or more instruction sets that can be executed by the microprocessor 204 to perform operations necessary to execute elements involving the various aspects of the methods and systems as described herein. For example, the application software 216 can include video decoding, rendering and manipulation logic.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions may be embodied in digital and analog communication links for electrical, optical, acoustical or other forms of propagated signals, such as carrier waves, infrared signals, digital signals, etc.

Figure 3:
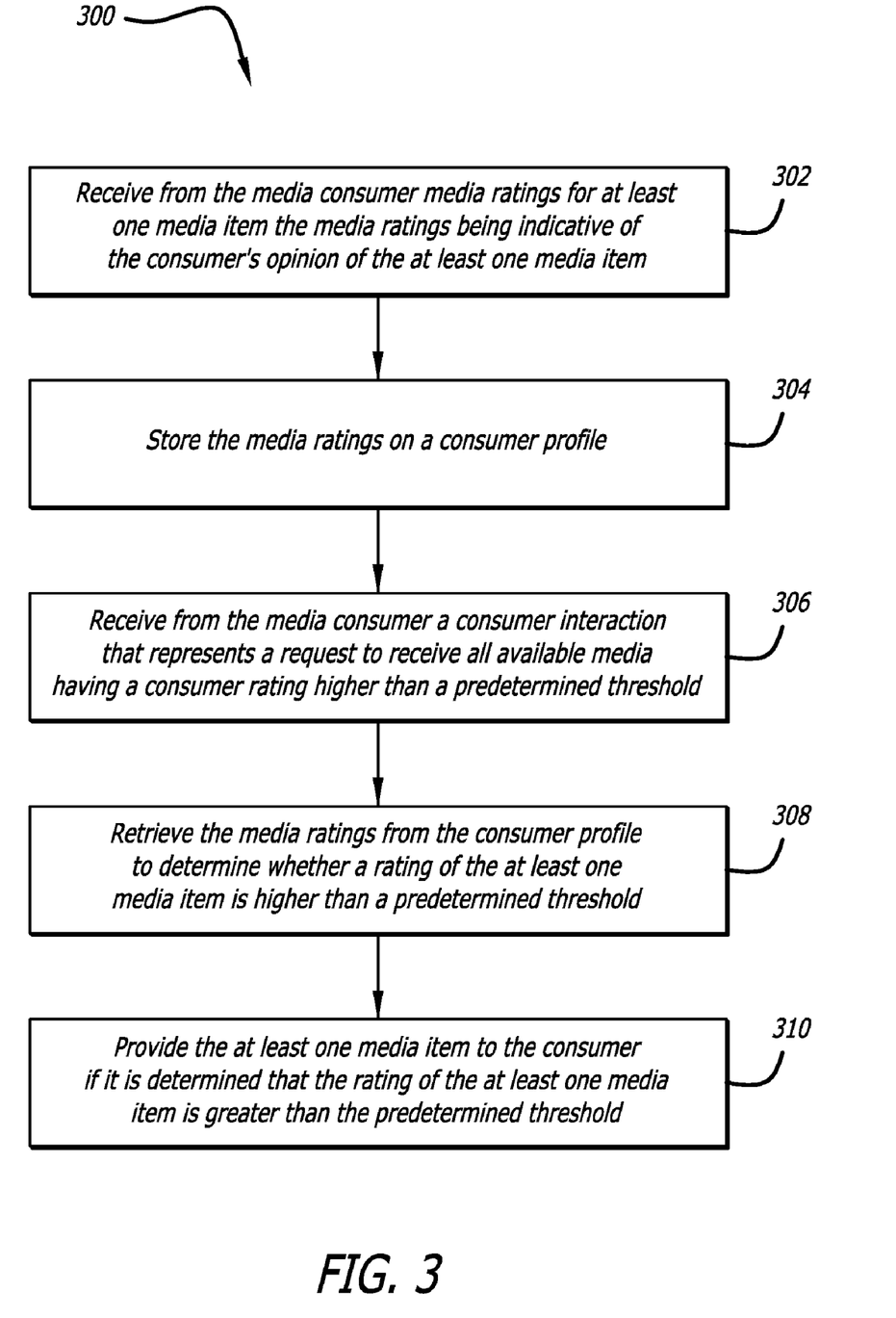
FIG. 3 depicts a flow diagram of a process for providing media to a consumer according to one embodiment.

FIG. 3 depicts a flow diagram of a process for providing media to a consumer according to one embodiment. At process block 302, media ratings for at least one media item are received from a media consumer. The media ratings are indicative of the consumer's opinion or liking of the at least one media item. Process 300 continues at process block 304.

At process block 304, the media ratings received from the media consumer are stored as part of a consumer profile. As mentioned above, the consumer profile can reside on a consumer profiles database 118. In another example, the consumer profile can reside in other consumer profile repositories such as data storage at the consumer computing device 102. Process 300 continues at process block 306.

At process block 306, a single consumer interaction is received from the media consumer. The single consumer interaction can represent a request to receive all available media having a consumer rating higher than a predetermined threshold. The single consumer interaction can be a single command received from the consumer computing device 102 at the user interface module 112. The consumer is permitted to provide such single command by, for example, clicking on a button that allows the consumer to indicate that all media having ratings greater than a predetermined threshold are to be provided to the consumer. Furthermore, the threshold can be determined in one embodiment by the consumer. For example, the consumer can request that all of the media items that the consumer has rated at three out of five would be downloaded and provided to the consumer. Process 300 continues at process block 308. The consumer interaction can of course be more than one click, page views or menus selections, but in any event the selection process by the consumer is greatly simplified over selecting numerous media items one-by-one or in groups smaller than would be imported or transferred as a result of the features and functions described herein.

At process block 308, media ratings are retrieved from the consumer profile. The media ratings are retrieved in order to determine whether a rating of the at least one media item is higher than a predetermined threshold. Process 300 continues at process block 310.

At process block 310, at least one media item is provided to the consumer if it is determined that the rating of the at least one media item is greater than the predetermined threshold. As previously mentioned, the at least one media item can be provided at a different media service than the media service associated with rating the media. Services provided by the media provider 106 can be a radio web cast station, an online music subscribing station, an online music streaming service, etc. Therefore, the ratings provided by the consumer can be utilized in order to subscribe the consumer to media items that have been rated highly by the consumer.

In one example, the consumer may have rated a genre with a high score such that an online radio station would tailor media to the consumer according to the consumer's genre ratings. Ratings provided by the consumer at the online radio station can be utilized to subscribe the consumer to media items in the highly rated genre. For example, if the consumer is also a subscriber to a media service that permits the consumer to store an online and/or local on-demand library, music that has been rated highly by the consumer at a radio station can be automatically added to the library of the consumer.

Figure 4:
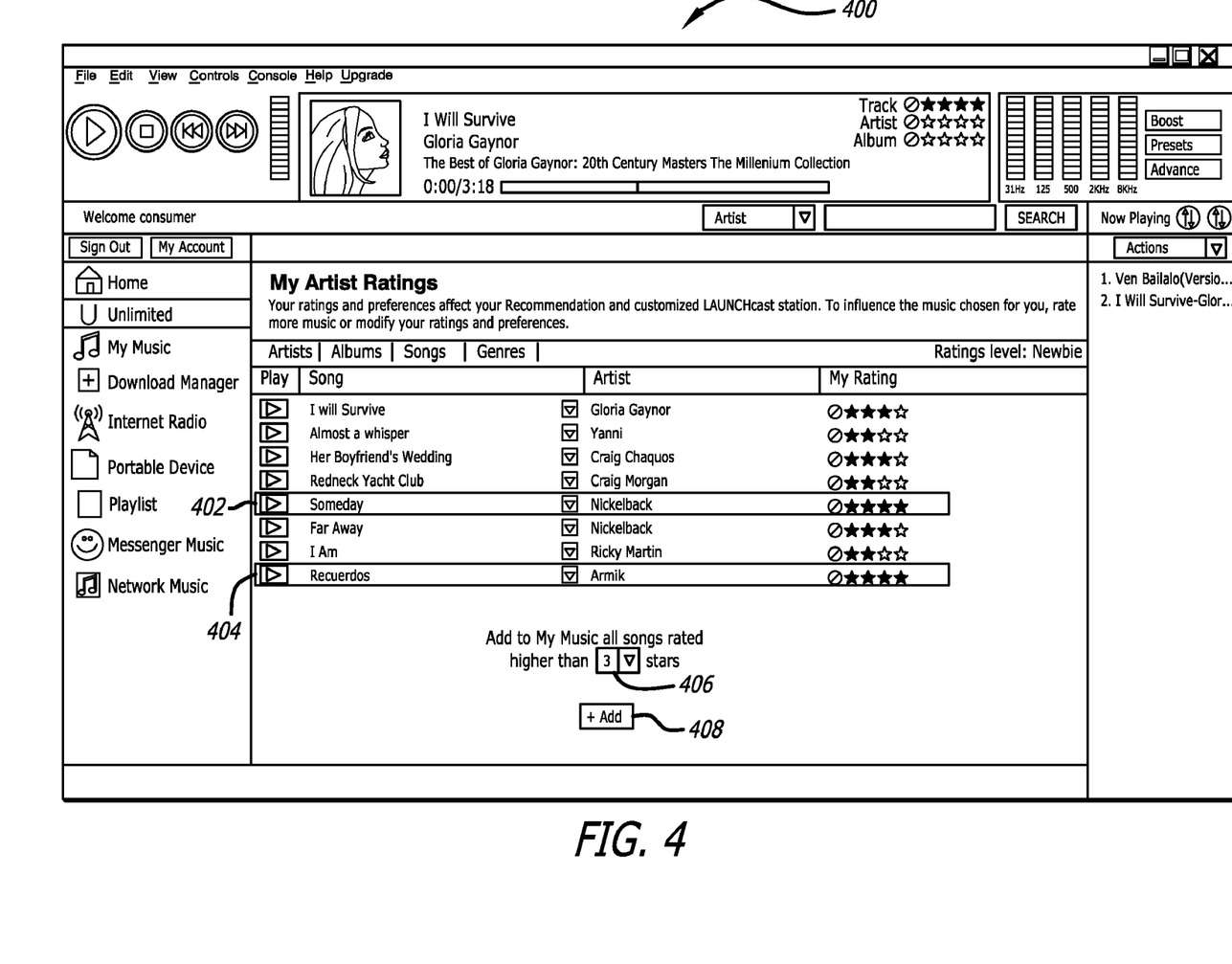
FIG. 4 depicts an exemplary user interface for rating songs according to one embodiment.

FIG. 4 depicts an exemplary user interface for rating songs according to one embodiment. User interface 400 illustrates a listing of songs that have been rated by the consumer. As such, a consumer can utilize user interface 400 to rate one or more songs. In one example, the consumer can rate the songs on a scale from one to four. For example, song listing 402, for artist "Nickelback" illustrates a rating of four out of four. Likewise, song listing 404 illustrates a rating of four out of four stars. Based on these ratings, the consumer can select to add the songs corresponding to song listing 402 and song listing 404 to the music library of the consumer by simply selecting one consumer interaction mechanism, namely, button 402. As such, songs that have been rated low or not rated at all are not added to the music library of the consumer. Furthermore, in another embodiment, the consumer can be provided with the option of selecting the threshold level at a dropdown menu 406. For example, the consumer can select that all songs rated higher than three out of four stars be added to the library of the consumer.

Figure 5:
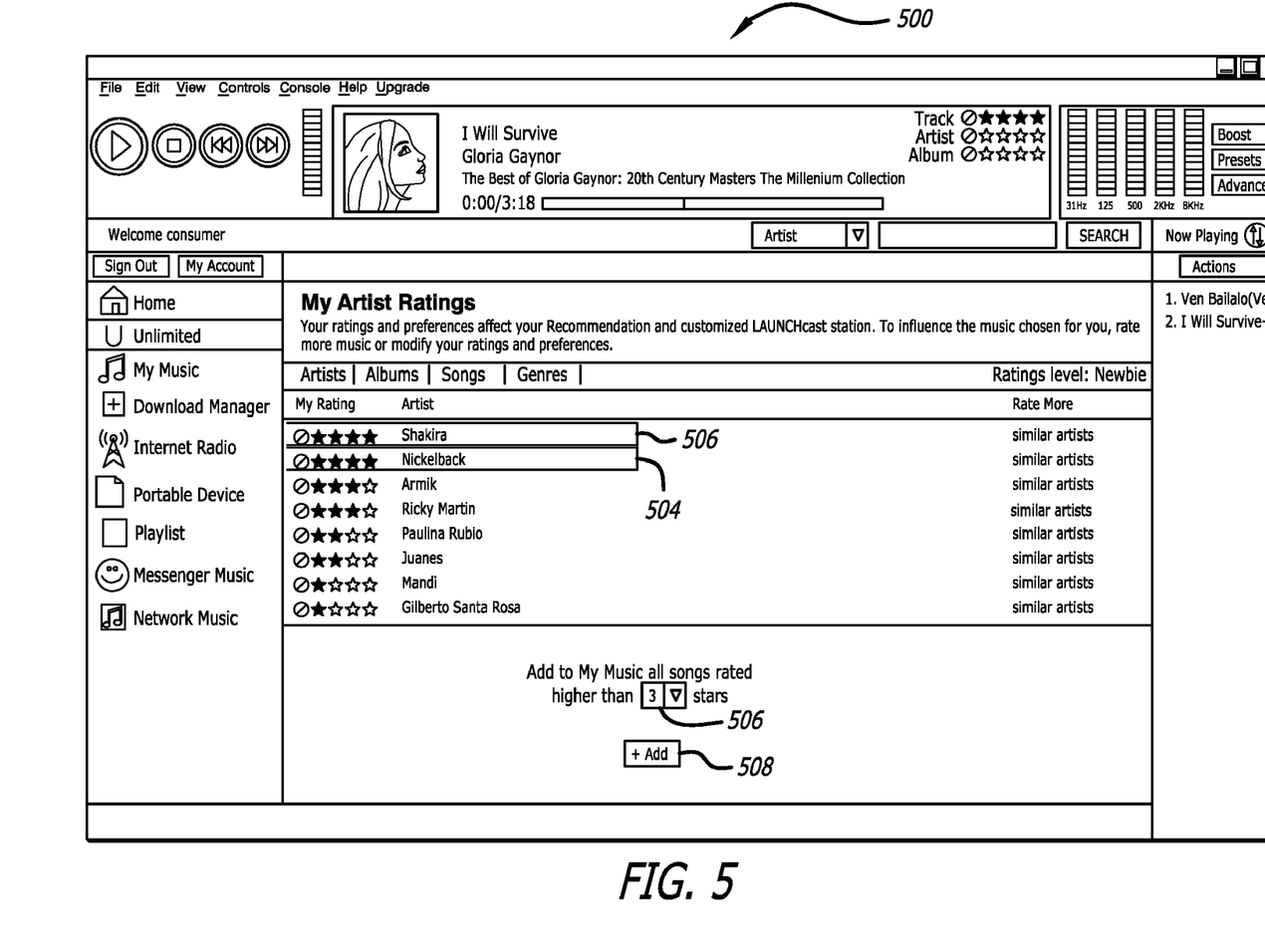
FIG. 5 depicts an exemplary user interface for rating artists according to one embodiment.

FIG. 5 depicts an exemplary user interface for rating artists according to one embodiment. Artist listing 502 corresponding to "Shakira" and artist listing 504 corresponding to "Nickelback" have been rated four out of four by the consumer. Other artists have been rated with a lower score. The consumer can select to add all of the songs corresponding to artists having a high rating to the consumer's library using a single consumer interaction. As illustrated in FIG. 5, "Nickelback" and "Shakira" have a high rating. Therefore, one single interaction the media consumer can click button 508 in order to add all the music corresponding to "Shakira" as well as all of the music and songs corresponding to "Nickelback" to the music library of the consumer. In addition, the consumer can select the threshold level used to add music to the consumer's library. For example, the consumer can select to add all songs of artists that have been rated higher than three stars out of four to the library of the consumer. The consumer can be presented with a dropdown menu 506 in order to select the minimum number of stars or ratings to be added to the music library of the consumer.

Figure 6:
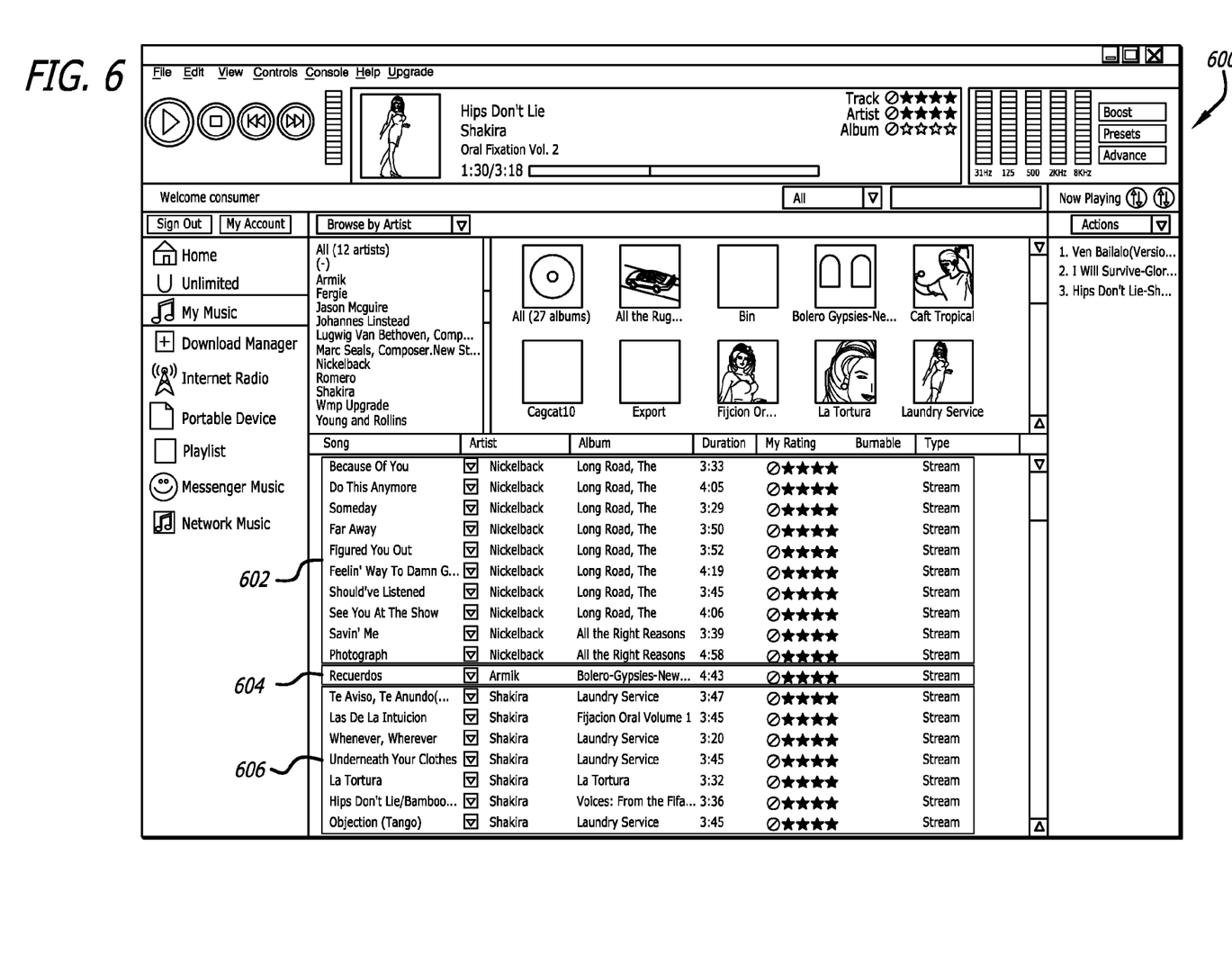
FIG. 6 depicts an exemplary user interface for viewing consumer's music according to one embodiment.

FIG. 6 depicts an exemplary user interface for viewing consumer's music according to one embodiment. User interface 600 illustrates a music library of a consumer. In particular, user interface 600 exemplifies the music library of the consumer once the consumer has rated songs and artists and further has elected to receive songs corresponding to artists and songs that have been rated highly by the consumer. For example, the listing of songs 602 corresponds to all of the songs available for artist "Nickelback," which was rated highly by the consumer. In addition, the listing of songs 606 is also included as part of the music library of the consumer because the consumer rated songs by artist "Shakira" with a rating of four out of four. In addition, a listing 604 is also included as part of the music library of the consumer since the song "Recuerdos" corresponding to artist "Armik" was also rated highly by the consumer. The rating for the song "Recuerdos" in listing 604 was higher than the threshold set by the consumer.

Figure 7:
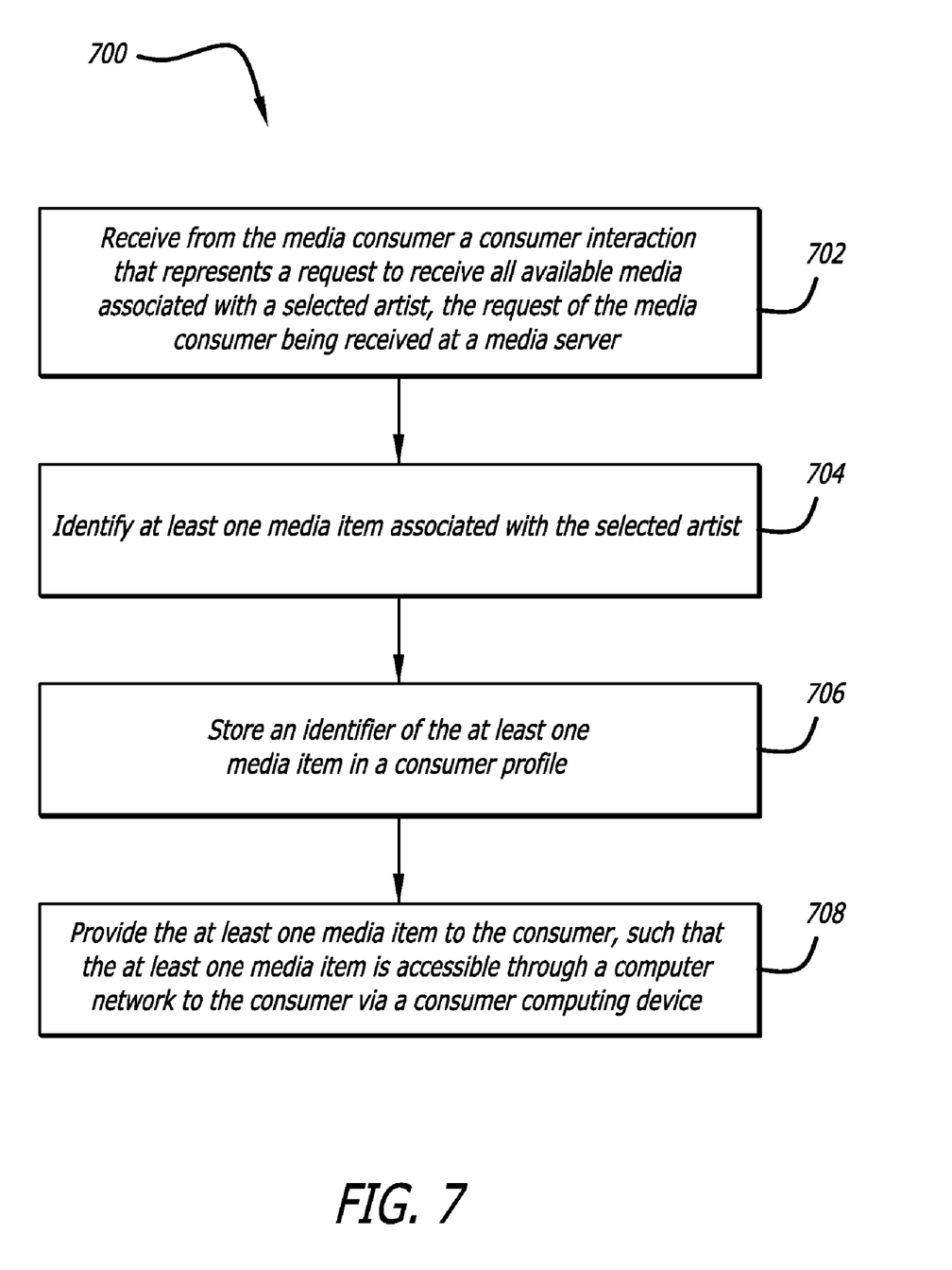
FIG. 7 depicts a flow diagram of a process for providing media to a consumer according to another embodiment.

FIG. 7 depicts a flow diagram of a process for providing media to a consumer according to another embodiment. At block 702 a single consumer interaction is received from a consumer. The consumer interaction represents a request to receive all available media associated with a selected artist. As such, the consumer can, for example, select an artist and request that all media stored at the media database 120 be added to the library of the media consumer. Process 700 continues at process block 704.

At process block 704, the media database 120 is searched in order to identify media associated with the selected artist. In one example, the search engine 114 can be configured to search for media stored at the media database 120 that is associated with the selected artist. Process 700 continues at process block 706.

At process block 706, an identifier or another media item representation can be stored at the consumer profile. In one embodiment, the identifier of the media item is added to the consumer profile in order to add the media item to the library of the consumer. As mentioned above, the consumer library can be stored as part of the user profile. Process 700 continues at process block 708.

At process block 708, the at least one media item is provided to the consumer. In one example, the at least one media item is provided to the consumer through the data network 104. In other steps, not shown, the system can track any new items of media associated with the selected artist (or rating as described above) and automatically add those new media items to the consumer's media library as they become available.

Figure 8:
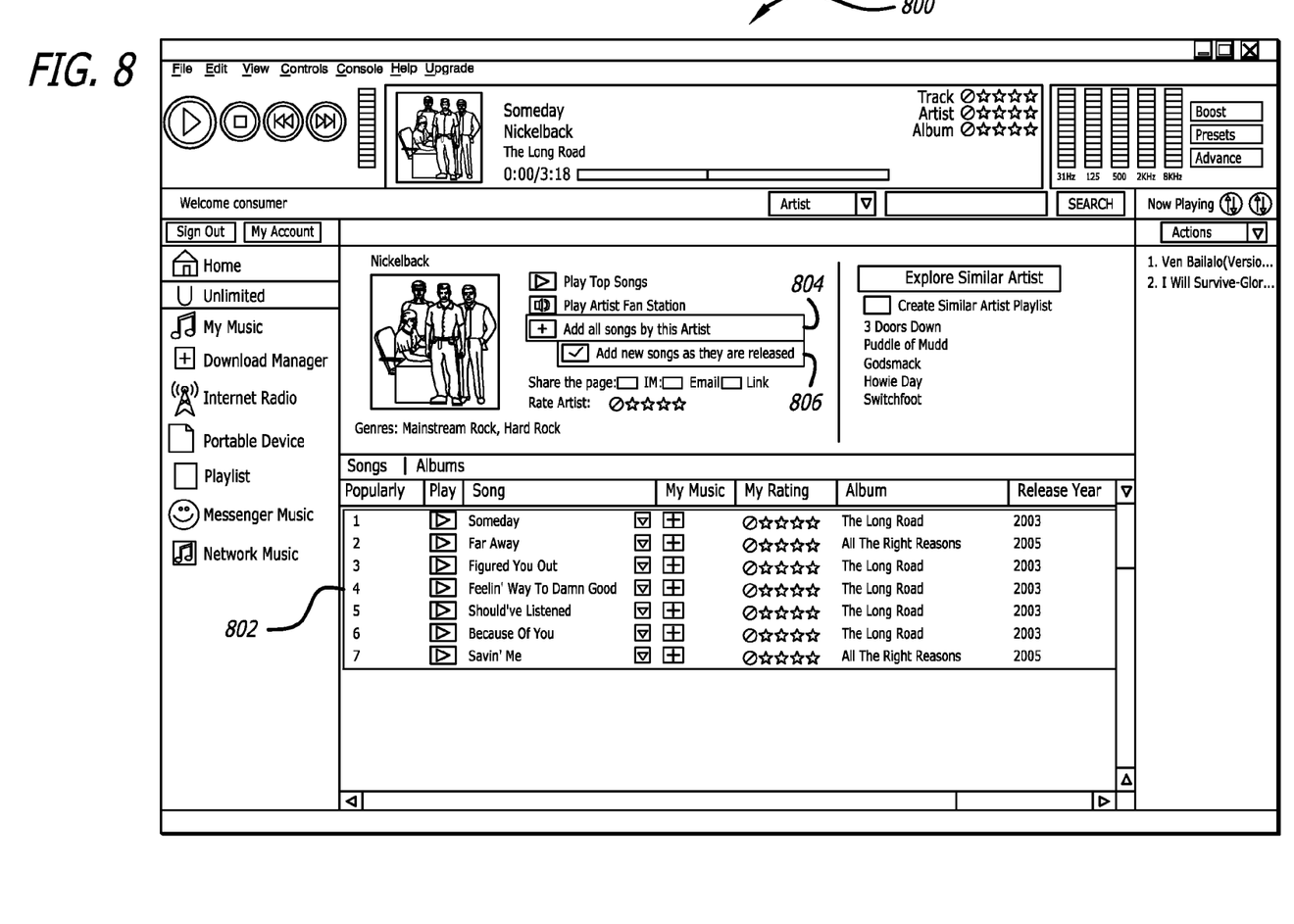
FIG. 8 depicts an exemplary user interface for selecting media of an artist with a single interaction according to one embodiment.

FIG. 8 depicts an exemplary user interface for selecting media of an artist with a single interaction according to one embodiment. Listing 802 includes songs of artists "Nickelback." Various user interface options can be provided associated with artist "Nickelback." Information related to an exemplary artist "Nickelback" can further be presented with an add button 802. The add button 802 can be utilized by a media consumer to add all of the songs corresponding to the artist "Nickelback." Thus, all of the songs corresponding to "Nickelback" would be added to the library of the media consumer.

In addition, the media consumer can further select to continue to add songs as they are released by the artist. Therefore, the media delivery module 116 can be configured to automatically subscribe a media consumer to new songs and add such new songs to the library. As previously discussed, adding new songs or media items to the media library of a media consumer can include adding the new songs or media items either by copying and providing a digital replica of the media item on the consumer profile, or by providing a link reference pointer or any other indicator of the address of a media item.

Figure 9:
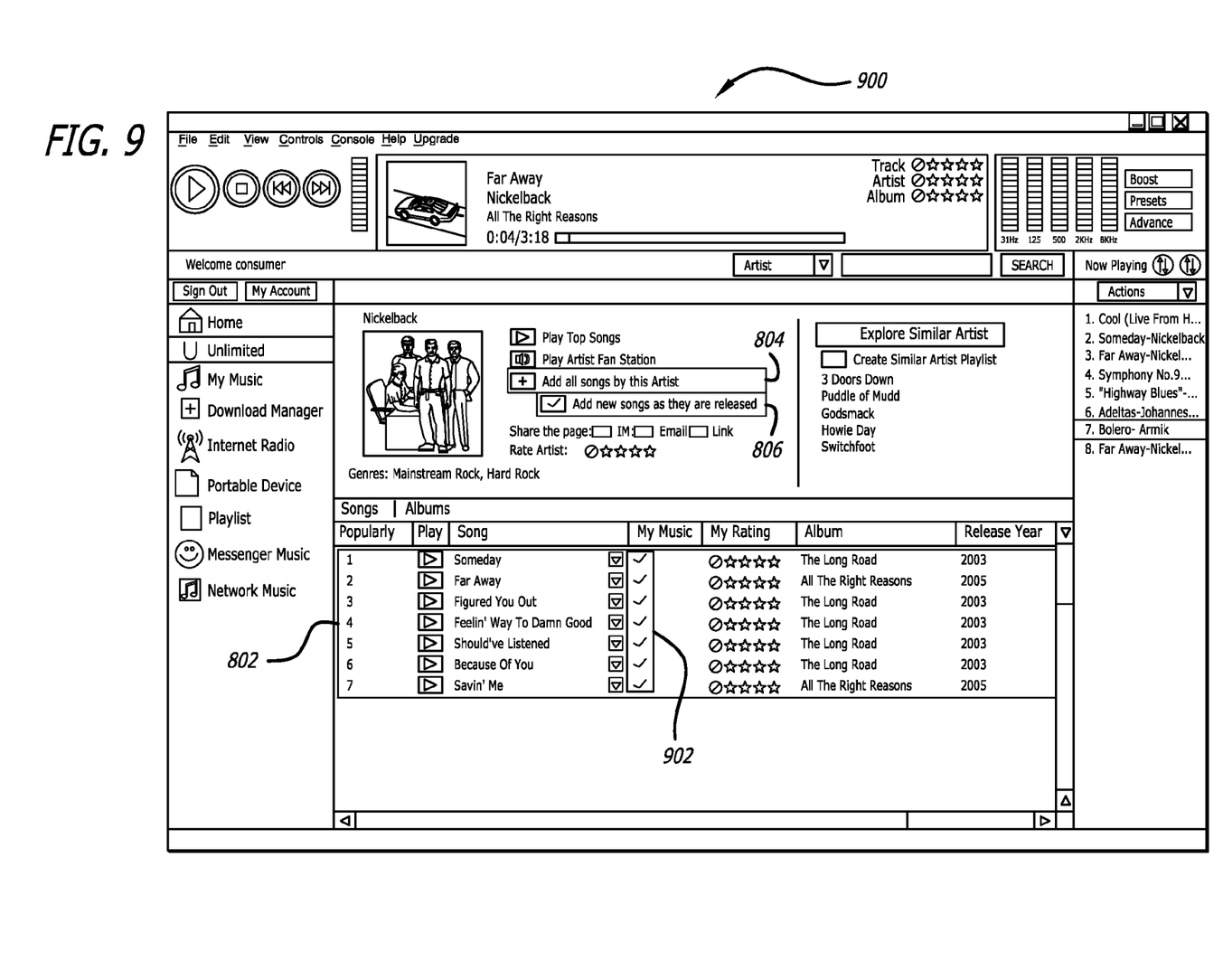
FIG. 9 depicts an exemplary user interface showing media that has been added to a consumer's library according to one embodiment.

FIG. 9 depicts an exemplary user interface showing media that has been added to a consumer's library according to one embodiment. User interface 900 illustrates a listing 802 of the songs associated with the artist being presented. In one example, the songs listed in listing 802 are songs associated with the artist "Nickelback." Furthermore, all of the songs associated with the artist "Nickelback" have been added to the consumer's library. In one example, as illustrated in listing 902, a checkmark displayed next to each listed media item can be indicative of the media item been added to the media library of the consumer.

As such, using a single interaction button as illustrated in FIG. 8, button 804, the consumer can subscribe or add to the consumer's library multiple media items with one click interaction for a particular type of media item. It is to be understood by one skilled in the art that the type of media item can not only refer to media items associated with an artist. For instance, in another embodiment, a media type that can be downloaded automatically in bulk can be all of the media items of a particular genre. Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

The invention claimed is

1. A method comprising:
receiving from a media consumer a media rating for at least one media item, the media rating being indicative of the consumer's opinion of the at least one media item, the media rating and the media identifier being responsive to the consumer's behavior related to the at least one media item;
storing, in a data storage, the media rating and a media identifier of the at least one media item as part of a consumer profile, said media rating and said media identifier being adjusted responsive to the monitored consumer behavior;
receiving from the media consumer a consumer interaction that requests all available media having a consumer rating, stored in the consumer profile, higher than a consumer set predetermined threshold;
retrieving the media rating and the media identifier from the consumer profile to determine whether the media rating of the at least one media item is higher than the predetermined threshold; and
providing the at least one media item to the consumer based on the media identifier retrieved from the consumer profile, said providing occurs if it is determined that the rating of the at least one media item is greater than the predetermined threshold;
wherein receiving the consumer interaction comprises:
receiving a first consumer selection that establishes the predetermined threshold; and
receiving a second consumer selection of a user interface button in order to import the available media to an online media library of the consumer.

2. The method of claim 1, wherein the media rating is received at first Internet media service, and the at least one media item is provided at a second Internet media service.

3. The method of claim 2, wherein the first Internet media service is a non on-demand media delivery service, and the second Internet media service is an on-demand media delivery service.

4. The method of claim 2, wherein the first Internet media service is an Internet radio station, and the second Internet media service is a media subscription-based media service.

5. The method of claim 1, wherein providing the at least one media item to the consumer comprises adding the at least one media item to an online media library of the consumer.

6. The method of claim 5, wherein adding the at least one media item to the online media library of the consumer comprises storing on a consumer profile a pointer to a media file corresponding to the at least one media item.

7. The method of claim 1, wherein receiving the consumer interaction comprises receiving a single consumer selection of a user interface button that allows the user to import the available media to an online media library of the consumer.

8. A system comprising:
a plurality of processors;
a ratings module, implemented by one of the plurality of processors, that receives from a media consumer a media rating for at least one media item, the media rating being indicative of the consumer's opinion of the at least one media item, the media rating and media identifier on the consumer profile being responsive to the consumer's behavior related to the at least one media item, the ratings module further configured to store the media rating and a media identifier of the at least one media item on a consumer profile the media rating and media identifier being adjusted responsive to the monitored consumer behavior;

a user interface module, implemented by one of the plurality of processors, that receives from the media consumer a consumer interaction representing a request to retrieve all available media having a consumer rating, stored in the consumer profile, higher than a consumer set predetermined threshold;

a search engine, implemented by one of the plurality of processors, that retrieves the media rating and the media identifier from the consumer profile to determine whether a rating of the at least one media item is higher than a predetermined threshold; and a media delivery module, implemented by one of the plurality of processors, that provides the at least one media item to the consumer based on the media identifier retrieved from the consumer profile, said providing occurs if it is determined that the rating of the at least one media item is greater than the predetermined threshold;

wherein receiving the consumer interaction comprises:

receiving a first consumer selection that establishes the predetermined threshold; and receiving a second consumer selection of a user interface button in order to import the available media to an online media library of the consumer.

9. The system of claim 8, wherein the media rating is received at first Internet media service, and the at least one media item is provided at a second a second Internet media service.

10. The system of claim 9, wherein the first Internet media service is an Internet radio station, and the second Internet media service is a media subscription-based service.

11. The system of claim 8, wherein the media delivery module is configured to add at least one media item an online library of the consumer.

12. The system of claim 8, wherein the consumer interaction comprises:

a first consumer selection that establishes the predetermined threshold; and a second consumer selection of a user interface button that allows the user to import the available media to an online media library of the consumer.

13. The system of claim 8, wherein the consumer interaction comprises a single consumer selection of a user interface button that allows the user to import the available media to an online media library of the consumer.

* * * * *